United States Patent

Bhattad et al.

(10) Patent No.: US 10,278,189 B2
(45) Date of Patent: Apr. 30, 2019

(54) WIRELESS COMMUNICATION IN VIEW OF TIME VARYING INTERFERENCE

(71) Applicant: QUALCOMM INCORPORATED, San Diego, CA (US)

(72) Inventors: Kapil Bhattad, Bangalore (IN); Dhananjay A. Gore, Bangalore (IN); Durga Prasad Malladi, San Diego, CA (US); Yongbin Wei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/208,560

(22) Filed: Jul. 12, 2016

(65) Prior Publication Data

US 2016/0323896 A1    Nov. 3, 2016

Related U.S. Application Data

(62) Division of application No. 13/853,013, filed on Mar. 28, 2013, now Pat. No. 9,426,714.
(Continued)

(51) Int. Cl.
*H04W 36/20* (2009.01)
*H04L 1/00* (2006.01)
(Continued)

(52) U.S. Cl.
CPC ........ *H04W 72/082* (2013.01); *H04B 17/345* (2015.01); *H04L 1/1829* (2013.01);
(Continued)

(58) Field of Classification Search
CPC .......... H04W 72/082; H04W 36/0008; H04W 36/30; H04W 36/0088; H04B 17/345; H04L 1/1829; H04L 5/14
(Continued)

(56) References Cited

U.S. PATENT DOCUMENTS 6,967,944 B2    11/2005    Choi
7,680,082 B2     3/2010    Lindoff
(Continued)

FOREIGN PATENT DOCUMENTS

CN    1666537 A     9/2005
CN   102025411 A    4/2011
(Continued)

OTHER PUBLICATIONS

Samsung: "Views on signaling requirements for CRS interference handling", 3GPP Draft; R2-121495 CRS Interference Cancellation, 3rd Generation Partnership Project (3GPP), Mobile Competence Centre; 650, Route Des Lucioles ; F-06921 Sophia-Antipolis Cedex; France, vol. RAN WG2, No. Jeju, Korea; 20120326-20120330, Mar. 19, 2012 (Mar. 19, 2012), XP050606005, [retrieved on Mar. 19, 2012] the whole document.
(Continued)

*Primary Examiner* — Marisol Figueroa
(74) *Attorney, Agent, or Firm* — Seyfarth Shaw LLP

(57) ABSTRACT

In wireless communication systems, a determination may be made whether to hand off a user equipment (UE) based on whether the UE encounters time varying interference, such as UE to UE interference. The time varying interference may be present only in a specific set of time/frequency resources or subframes. Measurement reporting may be restricted to time/frequency resources which do not experience the time varying interference.

36 Claims, 13 Drawing Sheets

Related U.S. Application Data

(60) Provisional application No. 61/619,260, filed on Apr. 2, 2012, provisional application No. 61/618,484, filed on Mar. 30, 2012.

(51) Int. Cl.

| | | |
|---|---|---|
| *H04W 72/08* | (2009.01) | |
| *H04W 36/30* | (2009.01) | |
| *H04W 36/00* | (2009.01) | |
| *H04L 1/18* | (2006.01) | |
| *H04B 17/345* | (2015.01) | |
| *H04L 5/14* | (2006.01) | |
| *H04W 72/04* | (2009.01) | |
| *H04W 84/04* | (2009.01) | |

(52) U.S. Cl.
CPC ........... *H04L 5/14* (2013.01); *H04W 36/0088* (2013.01); *H04W 36/30* (2013.01); *H04W 72/0413* (2013.01); *H04L 1/0026* (2013.01); *H04W 36/20* (2013.01); *H04W 84/042* (2013.01)

(58) Field of Classification Search
USPC ........................................................ 455/63.1
See application file for complete search history.

(56) References Cited

U.S. PATENT DOCUMENTS

| | | | | |
|---|---|---|---|---|
| 8,423,008 | B2* | 4/2013 | Pedersen | H04W 24/10 370/310.2 |
| 8,976,764 | B2* | 3/2015 | Suzuki | H04L 1/1887 370/336 |
| 9,161,236 | B2* | 10/2015 | Seo | H04W 24/00 |
| 2010/0238903 | A1 | 9/2010 | Kitazoe et al. | |
| 2011/0110251 | A1 | 5/2011 | Krishnamurthy et al. | |
| 2011/0149813 | A1 | 6/2011 | Parkvall et al. | |
| 2011/0235555 | A1 | 9/2011 | Zhang et al. | |
| 2011/0280163 | A1 | 11/2011 | Haustein et al. | |
| 2011/0312319 | A1 | 12/2011 | Lindoff et al. | |
| 2012/0113961 | A1* | 5/2012 | Krishnamurthy | H04L 1/0026 370/332 |
| 2012/0165029 | A1 | 6/2012 | Lindbom et al. | |
| 2012/0230232 | A1 | 9/2012 | Ji et al. | |
| 2012/0236736 | A1* | 9/2012 | Frank | H04W 24/04 370/252 |
| 2012/0264441 | A1 | 10/2012 | Chandrasekhar et al. | |
| 2012/0275322 | A1 | 11/2012 | Ji et al. | |
| 2012/0282864 | A1 | 11/2012 | Dimou et al. | |
| 2013/0035128 | A1 | 2/2013 | Chan et al. | |
| 2013/0107828 | A1* | 5/2013 | Dinan | H04W 52/346 370/329 |
| 2013/0223267 | A1 | 8/2013 | Jung et al. | |
| 2013/0260763 | A1 | 10/2013 | Bhattad et al. | |
| 2014/0079026 | A1 | 3/2014 | Dimou et al. | |
| 2014/0112180 | A1 | 4/2014 | Axmon et al. | |
| 2014/0160967 | A1 | 6/2014 | Gao et al. | |
| 2014/0256336 | A1 | 9/2014 | Manssour et al. | |
| 2014/0328328 | A1* | 11/2014 | Lindoff | H04W 72/042 370/332 |

FOREIGN PATENT DOCUMENTS

| | | |
|---|---|---|
| CN | 102291761 A | 12/2011 |
| JP | 2010525633 A | 7/2010 |
| WO | 03094539 A1 | 11/2003 |
| WO | 2008127185 A1 | 10/2008 |
| WO | 2011122833 A2 | 10/2011 |
| WO | 2011130384 | 10/2011 |
| WO | 2011130452 A2 | 10/2011 |
| WO | 2012027718 A1 | 3/2012 |
| WO | 2012034269 A1 | 3/2012 |

OTHER PUBLICATIONS

Shen Z. et al., "Dynamic Uplink-Downlink Configuration and Interference Management in TD-LTE," IEEE Communications Magazine, Nov. 2012, pp. 51-59.

LG Electronics: "Issues in Further Enhancements to L TE TDD", 3GPP Draft; R1-121461 ETDD Issues, 3rd Generation Partnership Project (3GPP), Mobile Competence Centre ; 650, Route Des Lucioles ; F-06921 Sophiaantipolis Cedex ; France, vol. RAN WG1 , No. Jeju, Korea; Mar. 26, 2012-Mar. 30, 2012, Mar. 20, 2012 (Mar. 20, 2012), XP050599742, (retrieved on Mar. 20, 2012].

3rd Generation Partnership Project; Technical Specification Group Radio Access Network; Evolved-Universal Terrestrial Radio Access (E-UTRA) and Evolved a Universal Terrestrial Radio Access Network (E-UTRAN); Overall description; Stage 2 (Release 11); Excerpt, pp. 1-21, 37-39,58-89, 115-118, 3GPP Standard; 3GPP TS 36.300, 3rd Generation Partnership Project (3GPP), Mobile Competence Centre; 650, Route Des Lucioles; F-06921 Sophia-Antipolis Cedex; France, vol. RAN WG2, No. V11.1.0, Mar. 12, 2012 (Mar. 2012), XP00269987, the whole document.

Alcatel-Lucent et al., "Inter-freq RRM Requirements for feICIC", 3GPP Draft; R4-120331, 3rd Generation Partnership Project (3GPP), Mobile Competence Centre; 650, Route Des Lucioles ; F-06921 Sophia-Antipolis Cedex; France, vol. RAN WG4, No. Dresden, Germany; Feb. 2, 2012-Feb. 10, 2012, Jan. 30, 2012 (Jan. 30, 2012), XP050568056, [retrieved on Jan. 30, 2012] the whole document.

European Search Report—EP15167552—Search Authority—The Hague—dated Sep. 10, 2015

European Search Report—EP15167556—Search Authority—The Hague—dated Sep. 10, 2015.

International Search Report and Written Opinion—PCT/US2013/034657—ISA/EPO—dated Oct. 7, 2013.

Partial International Search Report—PCT/US2013/034657—ISA/EPO—dated Jul. 25, 2013.

QUALCOMM Incorporated: "eICIC RLM and RRM Requirements", 3GPP Draft; R4-103790 EICIC RLMRRM Requirements, 3rd Generation Partnership Project (3GPP), Mobile Competence Centre; 658, Route Des Lucioles; F-06921 Sophia-Antipolis Cedex; France, vol. RAN WG4, No. Xian; Oct. 11, 2010, Oct. 7, 2010 (Oct. 7, 2010), XP050455429, [retrieved on Oct. 7, 2010] the whole document.

Research in Motion UK Limited: "Measurement Configuration for eICIC", 3GPP Draft; R2-106622 Measurement Configuration for EICIC, 3rd Generation Partnership Project (3GPP), Mobile Competence Centre; 658, Route Des Lucioles; F-06921 Sophia-Antipolis Cedex; France, vol. RAN WG2, No. Jacksonville, USA; Nov. 15, 2010, Nov. 9, 2010 (Nov. 9, 2010), XP050492378, [retrieved on Nov. 9, 2010] the whole document.

* cited by examiner

WIRELESS COMMUNICATION IN VIEW OF TIME VARYING INTERFERENCE

CROSS-REFERENCE TO RELATED APPLICATIONS

This application is a divisional of U.S. patent application Ser. No. 13/853,013, entitled "WIRELESS COMMUNICATION IN VIEW OF TIME VARYING INTERFERENCE," filed on Mar. 28, 2013, which claims the benefit under 35 U.S.C. § 119(e) to U.S. Provisional Patent Application No. 61/618,484, entitled "MEASUREMENTS FOR LOW DUTY CYCLE INTERFERENCE," filed on Mar. 30, 2012, and U.S. Provisional Patent Application No. 61/619,260 entitled "SUPPORTING COEXISTENCE OF DIFFERENT LTE-TDD CONFIGURATIONS IN NEIGHBORING REGIONS," filed on Apr. 2, 2012, the disclosures of which are expressly incorporated by reference herein in their entireties.

BACKGROUND

Field

Aspects of the present disclosure relate generally to wireless communication systems, and more particularly to wireless communication in view of time varying interference.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Offered is a method of wireless communication. The method includes communicating between a user equipment (UE) and a serving base station. The method also includes deciding whether to hand off the UE based at least in part on a report of time varying interference, whether the UE is expected to see time varying interference, a capability of the UE to handle the time varying interference, or which subframes are impacted by the time varying interference.

Offered is an apparatus for wireless communication. The apparatus includes means for communicating between a user equipment (UE) and a serving base station. The apparatus also includes means for deciding whether to hand off the UE based at least in part on a report of time varying interference, whether the UE is expected to see time varying interference, a capability of the UE to handle the time varying interference, or which subframes are impacted by the time varying interference.

Offered is a computer program product for communication in a wireless network. The computer program product includes a non-transitory computer-readable medium having program code recorded thereon. The program code includes program code to communicate between a user equipment (UE) and a serving base station. The program code also includes program code to decide whether to hand off the UE based at least in part on a report of time varying interference, whether the UE is expected to see time varying interference, a capability of the UE to handle the time varying interference, or which subframes are impacted by the time varying interference.

Offered is an apparatus for wireless communication. The apparatus includes a memory and a processor(s) coupled to the memory. The processor(s) is configured to communicate between a user equipment (UE) and a serving base station. The processor(s) is also configured to decide whether to hand off the UE based at least in part on a report of time varying interference, whether the UE is expected to see time varying interference, a capability of the UE to handle the time varying interference, or which subframes are impacted by the time varying interference.

Offered is a method of wireless communication. The method includes deciding to restrict measurements to specific subframes. The method also includes reporting measurements of the specific subframes by a user equipment (UE).

Offered is an apparatus for wireless communication. The apparatus includes means for deciding to restrict measurements to specific subframes. The apparatus also includes means for reporting measurements of the specific subframes by a user equipment (UE).

Offered is a computer program product for communication in a wireless network. The computer program product includes a non-transitory computer-readable medium having program code recorded thereon. The program code includes program code to decide to restrict measurements to specific subframes. The program code also includes program code to report measurements of the specific subframes by a user equipment (UE).

Offered is an apparatus for wireless communication. The apparatus includes a memory and a processor(s) coupled to the memory. The processor(s) is configured to decide to restrict measurements to specific subframes. The processor(s) is also configured to report measurements of the specific subframes by a user equipment (UE).

Offered is a method of wireless communication. The method includes deciding to restrict measurements to specific sets of time/frequency resources for a user equipment (UE) operating in idle mode or performing inter-frequency measurement. The method also includes signaling to the UE information indicating the restrictions. In one example, the signaling of the restricted measurement information is UE specific, cell specific, or common for all cells in a paging area. In one example, signaling the restricted measurement information is based at least in part on a system information block (SIB) or master information block (MIB).

Offered is an apparatus for wireless communication. The apparatus includes means for deciding to restrict measurements to specific sets of time/frequency resources for a user equipment (UE) operating in idle mode or performing inter-frequency measurement. The apparatus also includes means for signaling to the UE information indicating the restrictions.

Offered is a computer program product for communication in a wireless network. The computer program product includes a non-transitory computer-readable medium having program code recorded thereon. The program code includes program code to decide to restrict measurements to specific sets of time/frequency resources for a user equipment (UE) operating in idle mode or performing inter-frequency measurement. The program code also includes program code to signal to the UE information indicating the restrictions.

Offered is an apparatus for wireless communication. The apparatus includes a memory and a processor(s) coupled to the memory. The processor(s) is configured to decide to restrict measurements to specific sets of time/frequency resources for a user equipment (UE) operating in idle mode or performing inter-frequency measurement. The processor(s) is also configured to signal to the UE information indicating the restrictions.

Offered is a method of wireless communication. The method includes restricting measurements to specific sets of time/frequency resources for a user equipment operating in idle mode or performing inter-frequency measurement. The method also includes reporting measurements of the specific sets of time/frequency resources. Also offered is an apparatus for wireless communication. The apparatus includes means for restricting measurements to specific sets of time/frequency resources for a user equipment operating in idle mode or performing inter-frequency measurement. The apparatus also includes means for reporting measurements of the specific sets of time/frequency resources. Also offered is a computer program product for communication in a wireless network. The computer program product includes a non-transitory computer-readable medium having program code recorded thereon. The program code includes program code to restrict measurements to specific sets of time/ frequency resources for a user equipment operating in idle mode or performing inter-frequency measurement. The program code also includes program code to report measurements of the specific sets of time/frequency resources. Also offered is an apparatus for wireless communication. The apparatus includes a memory and a processor(s) coupled to the memory. The processor(s) is configured to restrict measurements to specific sets of time/frequency resources for a user equipment operating in idle mode or performing inter-frequency measurement. The processor(s) is also configured to report measurements of the specific sets of time/frequency resources.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise. LTE and LTE-Advanced are collectively referred to as "LTE".

Figure 1:
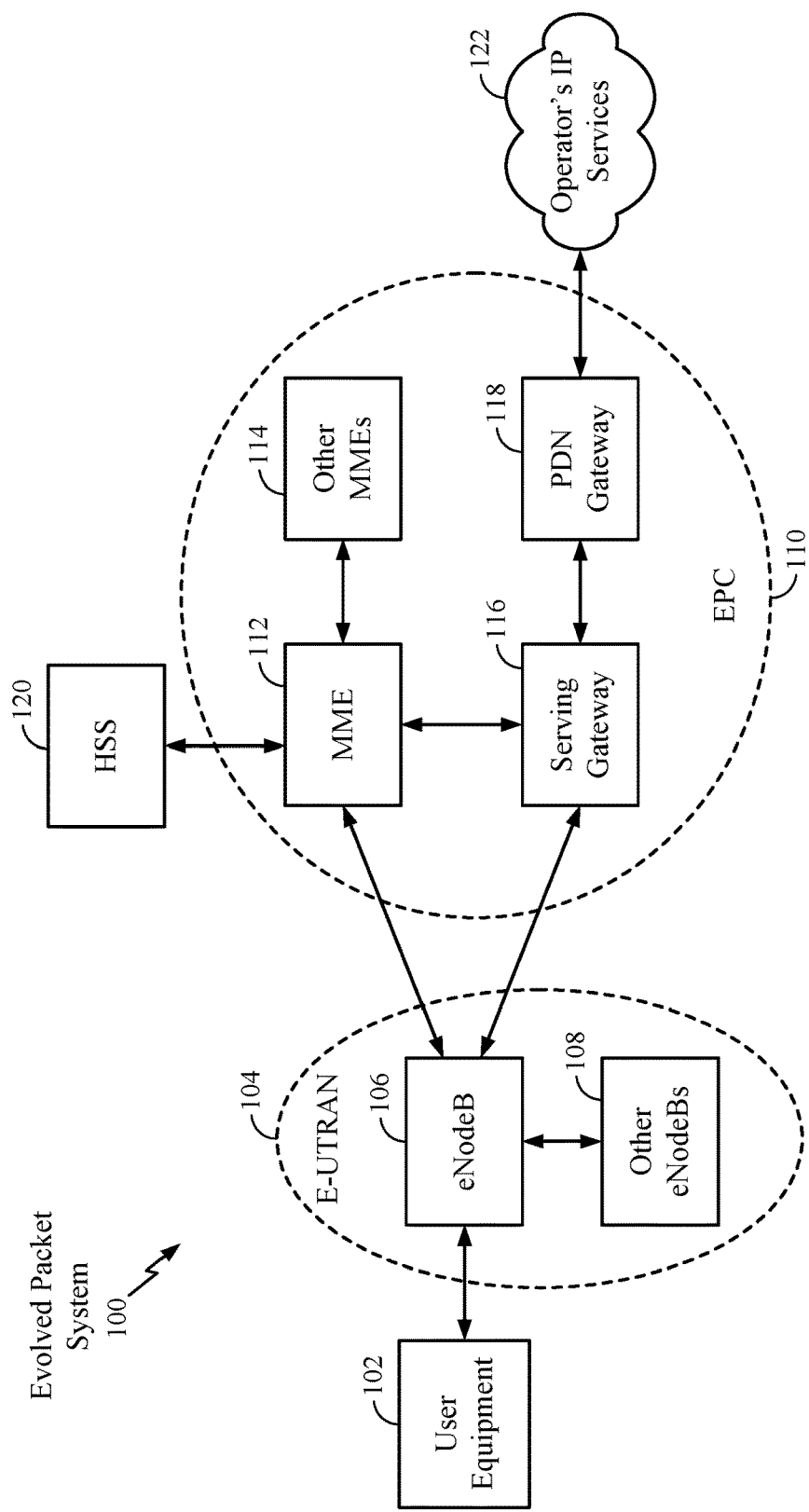
FIG. 1 is a diagram illustrating an example of a network architecture.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, an access point, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a tablet, a netbook, a smartbook, an ultrabook, a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS (packet-switched) Streaming Service (PSS).

Figure 2:
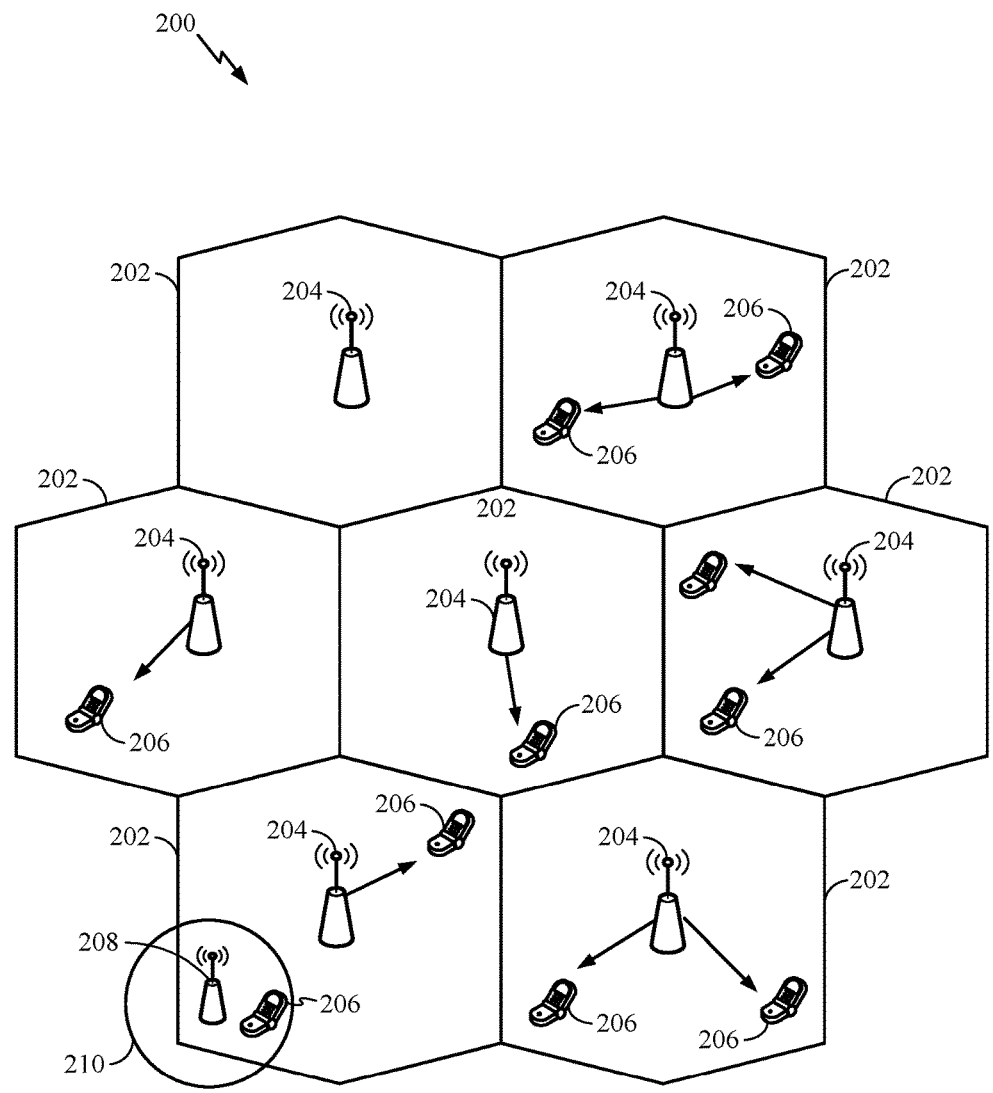
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
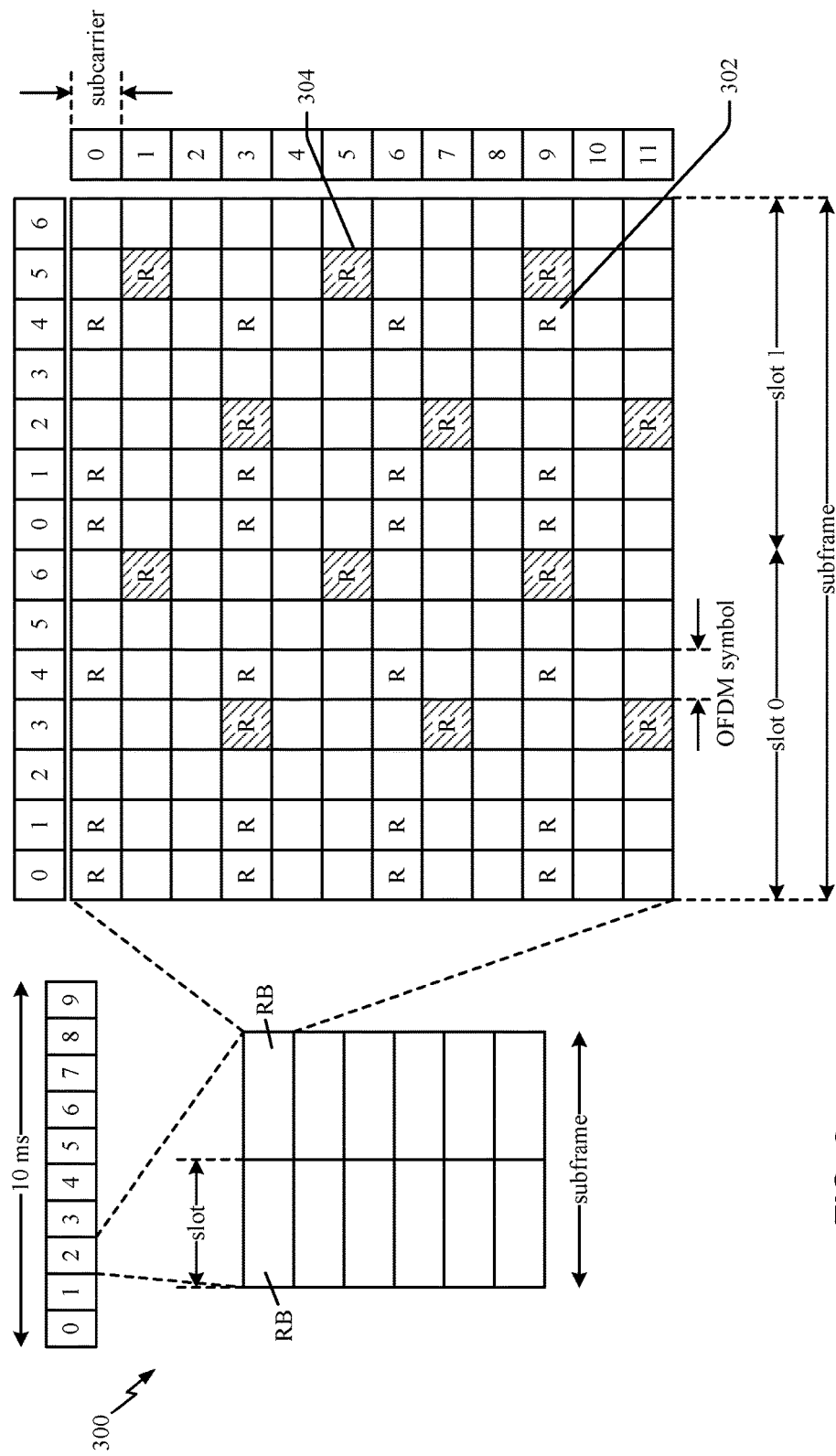
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a time/frequency resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include downlink reference signals (DL-RS). The DL-RS include Cell-specific RS (CRS) (also sometimes called common RS) 302 and UE-specific RS (UE-RS) 304. UE-RS 304 is transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
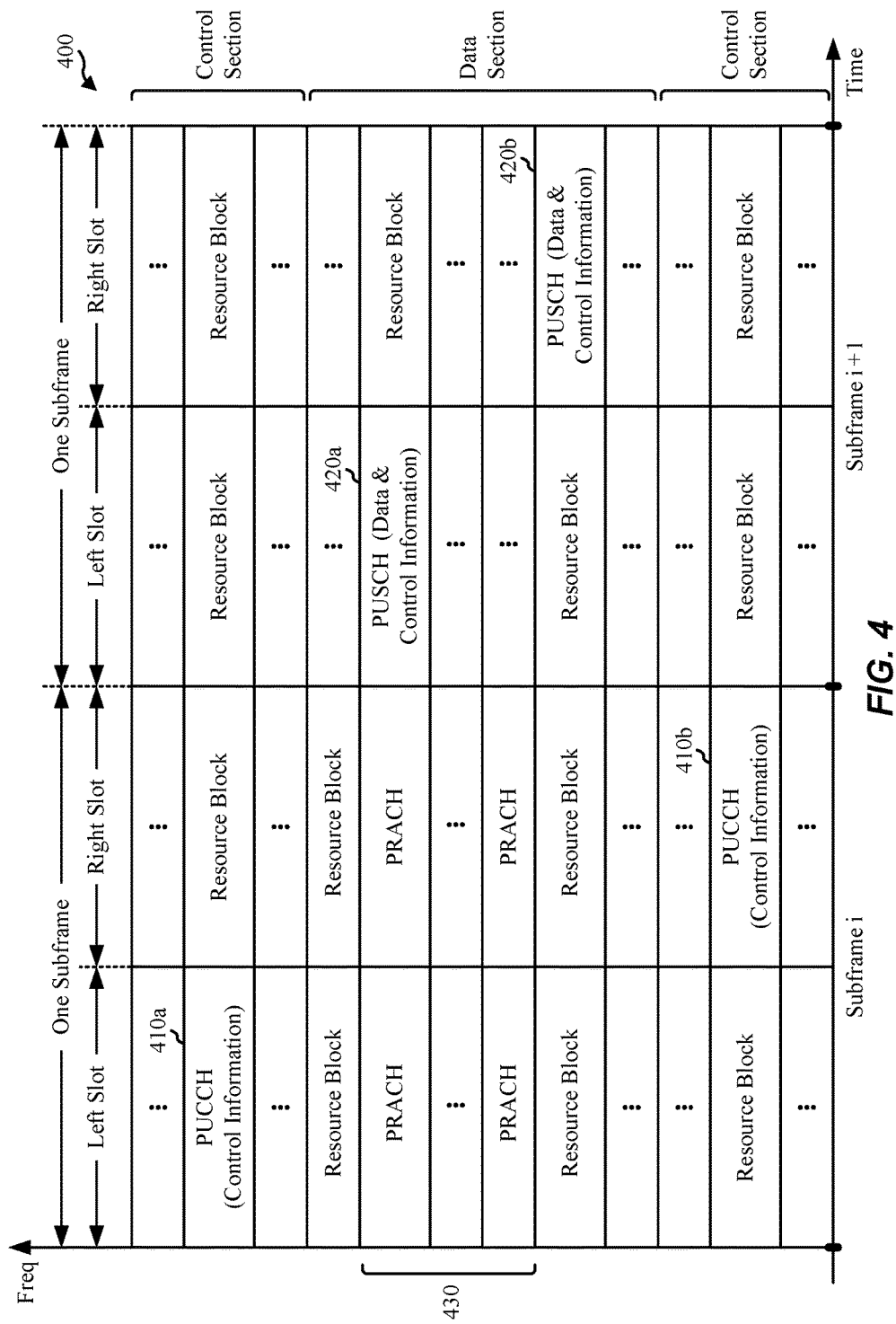
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The time/frequency resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned time/frequency resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
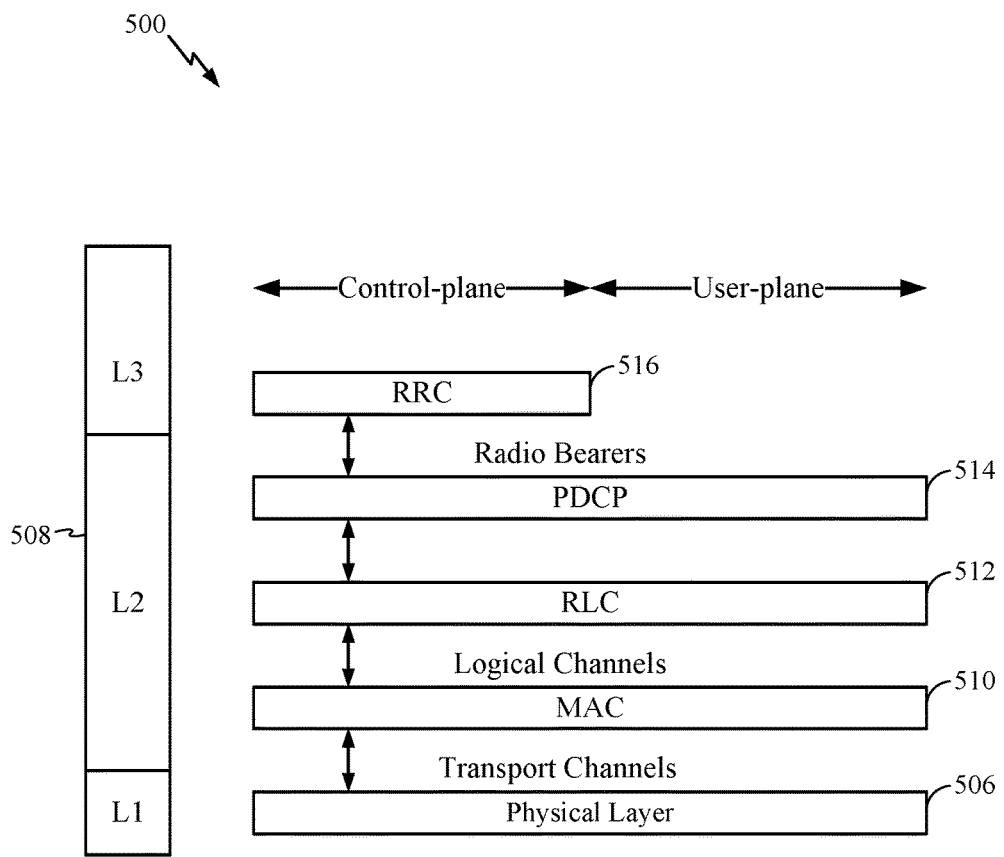
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
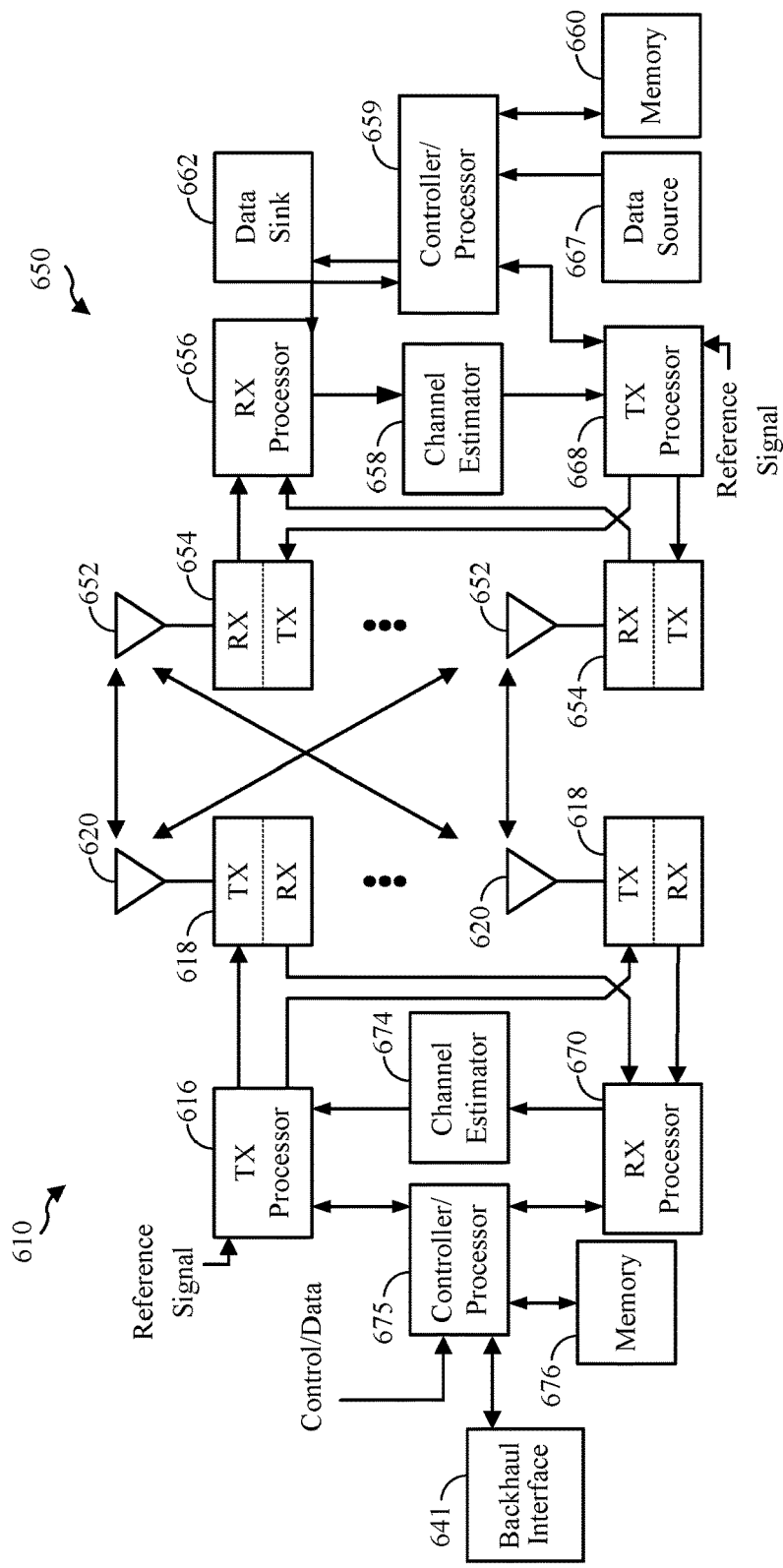
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675, e.g., implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616, e.g., implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal or channel condition feedback transmitted by the UE 650. Each spatial stream is then provided to a different antenna 620 via a separate transmitter/modulator 618TX. Each transmitter 618TX modulates an RF carrier with a respective spatial stream for transmission.

At the UE 650, each receiver/demodulator 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659, e.g., implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659, e.g., implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters/modulators 654TX. Each transmitter 654TX modulates an RF carrier with a respective spatial stream for transmission.

The uplink transmission is processed at the eNodeB 610 in a manner similar to that described in connection with the receiver function at the UE 650. Each receiver/demodulator 618RX receives a signal through its respective antenna 620. Each receiver 618RX recovers information modulated onto an RF carrier and provides the information to a RX processor 670. The RX processor 670 may, e.g., implement the L1 layer.

The controller/processor 675, e.g., implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK or NACK protocol to support HARQ operations. The base station 610 may send messages to other base stations, for example, over an backhaul interface 641, such as an X2 interface. The controller/processor 675 and the controller/processor 659 may direct the operation at the eNodeB 610 and the UE 650, respectively. The controller/processor 675 or other processors and modules at the eNodeB 610 or the controller/processor 659 or other processors and modules at the UE 650 may perform or direct the execution of various processes for the techniques described herein. The memory 676 and the memory 660 may store data and program codes for the eNodeB 610 and the UE 650, respectively.

When devices of a single radio access technology or different radio access technologies in a proximate communication spectrum are operating at the same time, potential interference between devices may occur. For example, if one communication device is attempting to receive communications at the same time that another device is transmitting, and both devices are using the same or proximate portions of a communication spectrum, the receiving device may experience interference.

In LTE-TDD, both uplink transmissions from UEs to an eNodeB and downlink transmissions from an eNodeB to UEs use the same communication spectrum. The uplink and downlink transmissions are orthogonalized in time to coordinate communication among a number of UEs. Different time division duplex (TDD) configurations may be specified to coordinate the transmission and reception times for the UEs. The different TDD configurations supported in LTE are shown in TABLE 1 below.

TABLE 1

| UL-DL Config | DL-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In TABLE 1, D indicates a subframe for downlink (DL) (i.e., eNodeB to UE communications), U indicates a subframe for uplink (UL) (i.e., UE to eNodeB communications), and S indicates a special subframe. A special subframe may include downlink OFDM symbols, a guard period, and uplink OFDM symbols.

In LTE-TDD implementations, neighboring eNodeB base stations may be synchronized with the same subframe boundaries. Additionally, neighboring base stations may operate in the same TDD configuration as their neighbors. For example, two neighboring base stations may both operate using TDD configuration 0 with a downlink subframe, a special subframe, and three uplink subframe, repeating every 5 ms. Thus, when one base station is transmitting on the downlink, a neighboring base station also transmits on the downlink. In this scenario, a UE that is served by one base station may experience interference in a downlink subframe due to downlink transmission from a neighboring base station. For example, as shown in FIG. 7, a UE 702 located near the service boundaries between the two base stations 704, 708 may experience interference in a downlink subframe due to downlink transmission 714 from a neighboring base station 708.

Figure 7:
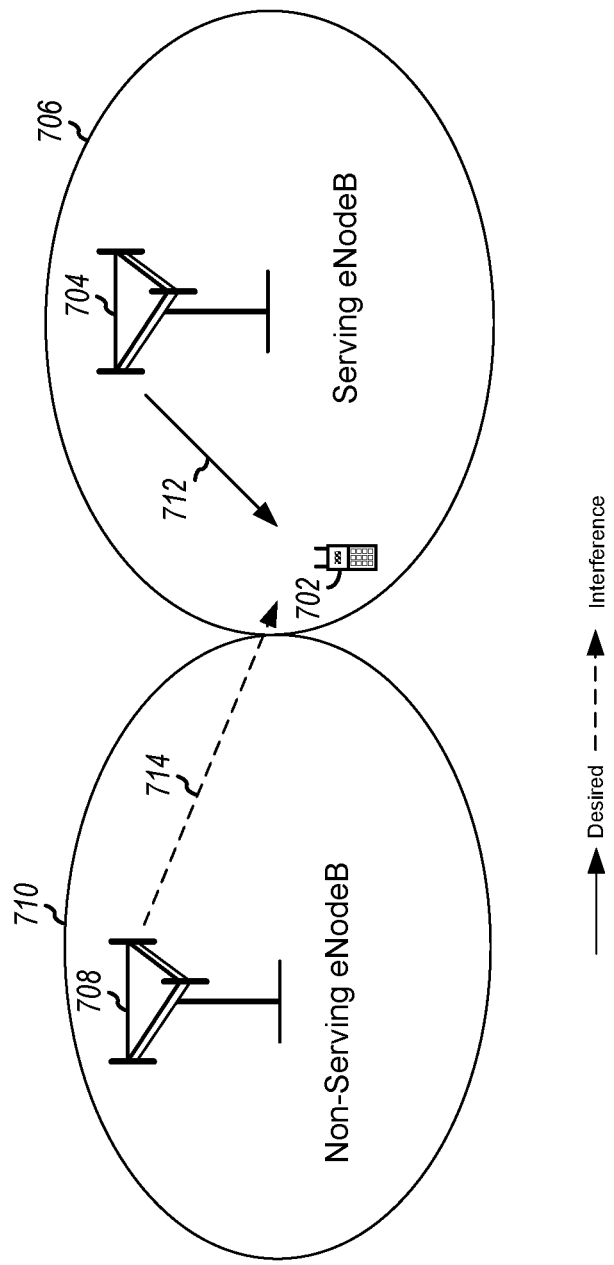
FIG. 7 is a block diagram illustrating interference from a neighbor base station in a telecommunications system.

As shown in FIG. 7, the UE 702 is served by the eNodeB 704 at the edge of the service area 706. Downlink transmission 712 is a signal intended to be received by the UE 702. Still, the UE 702 may also receive downlink (DL) transmission 714 from the non-serving eNodeB 708 because the UE 702 is near to the edge of the service area 710 of the non-serving eNodeB 708. The downlink transmissions 714 from the eNodeB 708 may interfere with the reception of the intended downlink transmission 712. Typically, a UE 702 is connected to the strongest available cell. Therefore, the interfering downlink transmission 714 is likely to be weaker, or in the same range of strength, than the intended downlink transmission 712.

While LTE-TDD is primarily designed for the case when neighboring cells use the same configuration, it may be desirable to allow the eNodeB to choose the TDD configuration depending on the eNodeB's traffic conditions. Thus, in some cases neighboring base stations may operate using different TDD configurations.

Figure 8:
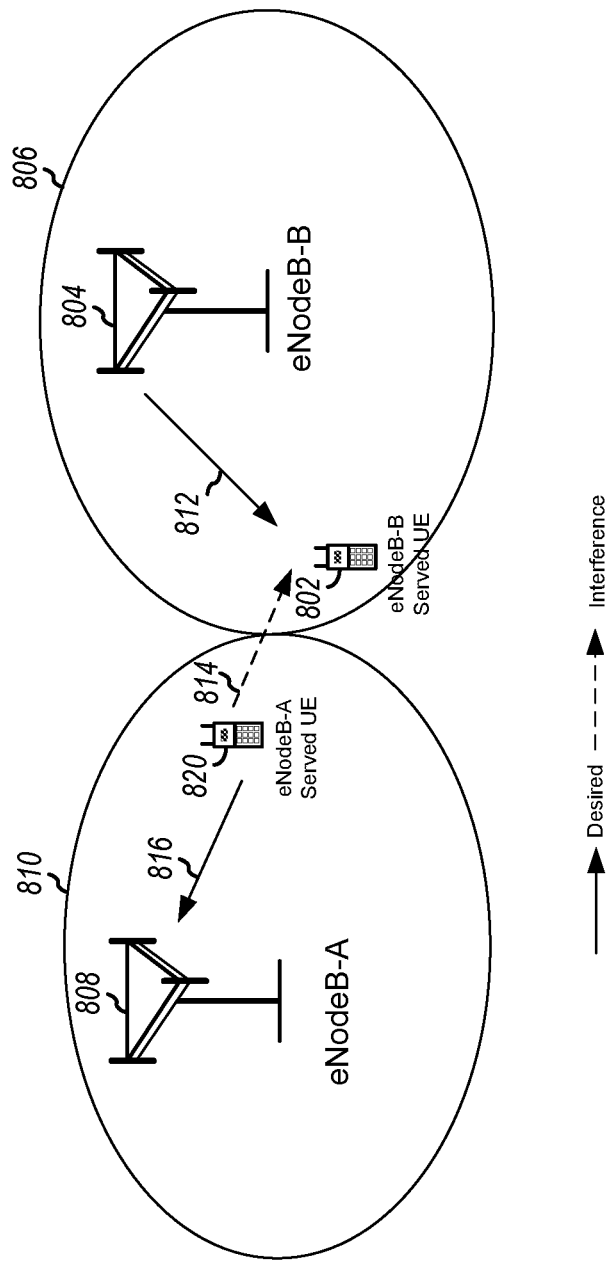
FIG. 8 is a block diagram illustrating interference from another UE in a telecommunications system.

Accordingly, when the neighboring base stations operate using different TDD configurations, uplink communications for one base station may occur at the same time as downlink communications for another base station. Moreover, when neighboring cells are using different TDD configurations, because the same spectrum is used for downlink and uplink communications, a UE may experience downlink interference from a UE engaging in uplink communications with a neighboring eNodeB. FIG. 8 illustrates an example of a UE experiencing downlink interference from a UE engaging in uplink communications with a neighboring eNodeB when neighboring cells use different TDD configurations.

As shown in FIG. 8, the first eNodeB 808 is engaged in uplink communications 816 during its uplink subframe with the UE 820 at the same time the second eNodeB 804 is engaged in downlink communications 812 during its downlink subframe with the UE 802. That is, the UE 820 is transmitting an uplink subframe at the same time as the UE 802 is receiving a downlink subframe. The same communication bandwidth may be shared by each UE for both uplink and downlink communications. Thus, because the UEs 820, 802 are located near each other (and near the edge of the respective eNodeB coverage areas 810 and 806), the uplink transmissions 816 of the UE 820 may interfere (814) with the downlink reception of the UE 802. In some cases, the UE 820 may be transmitting at a lower power than the second eNodeB 804, still, if the UE 820 is within a specific distance to the UE 802, the uplink interference 814 from the UE 820 may be a stronger received signal from the perspective of the UE 802 than the intended downlink communication 812 from the second eNodeB 804. This situation may lead to pronounced interference to the UE 802.

Typically, UEs are not designed to handle unequal levels of interference on the downlink subframes. Rather, for example, UEs may be designed assuming similar interference levels on all downlink subframes. Thus, in some cases, interference experienced on only one subframe may lead to poor performance on several subframes and possibly result in link failure or a dropped call.

In some cases, a UE may filter channel estimates obtained from a common reference signal (CRS) over multiple subframes without weighting according to the interference level. As an example, the channel estimation may be corrupted by the UE to UE interference on one subframe. Accordingly, the corrupt channel estimation may result in poor performance on one or more subsequent subframes.

Moreover, in some cases, automatic gain control (AGC) may be controlled based on received signal power. In one example, the UE to UE interference experienced on one subframe may result in a large received power. Based on the large received power, the AGC may assume a large average received power. The large average received power may result in poor quantization on downlink subframes not observing UE to UE interference and possible radio link failure.

Similar interference issues may also occur if two adjacent carriers operate in different but neighboring bandwidth spectrums. The interference can occur if the carriers use different TDD configurations on subframes that are downlink for one carrier frequency and uplink for another carrier frequency. For example, if one carrier communicates in bandwidth spectrum 2305 to 2325 MHz while another carrier communicates in bandwidth spectrum 2327.5 to 2357.5 MHz, the guard band between the carriers is only 2.5 MHz. In some cases UE transmission leakage from the UE's carrier spectrum to a neighboring carrier's spectrum may cause higher interference in the neighboring UEs' bandwidth. The interference caused may decrease as frequency spacing increases. Data allocated on the edge of the frequency band closer to the interfering carrier may see more of this interference than data allocated on the center resource blocks. Additionally, for a UE of the first carrier, the transmit power in its bandwidth may cause AGC saturation at a neighboring UE operating on the second carrier.

Reference signal received power (RSRP) is one measurement of signal strength. Additionally, reference signal received quality (RSRQ) is a ratio of the reference signal received power and the received strength signal indicator (RSSI). In other words, the reference signal received quality is the difference of the reference signal received power and received strength signal indicator in dB. The received strength signal indicator may refer to a sum of the signal strength and the interference. An eNodeB may request a UE to report reference signal received power and reference signal received quality measurements to determine whether a handover should be initiated. For example, an eNodeB may initiate a handover of the UE to another network, such as a universal mobile telecommunications system (UMTS) network, if the reference signal received quality is below a threshold on an LTE link.

The received strength signal indicator or reference signal received quality measurement may change from subframe to subframe when the UE experiences interference that changes with time. Thus, various solutions may be specified for the UE to compute and report the strength signal indicator or reference signal received quality measurement when interference changes with time. Furthermore, other solutions may be specified for how the eNodeB may determine handover decisions based on the signal strength indicator or reference signal received quality reports. That is, the determination is based on which specific subframes actually experience interference. For example, a handover may be triggered for UEs that have difficulty with interference variations. Alternatively, a handover may not be triggered for UEs that are designed to handle interference variations. Presented are solutions for computing and reporting the strength signal indicator or reference signal received quality and determining when to initiate a UE handover. In the presented solutions, it is noted that a handover may be triggered for UEs that may not handle interference variations.

According to one aspect of the present disclosure, a base station, such as an eNodeB, initiates a handover of the UE based on the measured UE to UE interference. For example, the eNodeB may initiate a handover of a UE based on UE transmitted reports for UE to UE interference, a UE capability to handle the UE to UE interference, whether the UE is expected to see UE to UE interference, a duty cycle of UE to UE interference, the subframes that are impacted by the UE to UE interference, or a combination thereof.

In one configuration, the UE may report a channel state, such as a channel quality index (CQI), to the eNodeB in only certain subframes. In other words, restricted measurements occur. Specifically, the UE may generate a channel state report for subframes that do not experience UE to UE interference and another channel state report for subframes that experience UE to UE interference. In one configuration, the UE reports subframes that experience UE to UE interference. In one aspect this report may be a single bit that indicates to the base station that the UE is experiencing UE to UE interference on a subframe. In another configuration, the UE only reports subframes that do not experience UE to UE interference. The channel state reports may include a reference signal received power, a received strength signal indicator, or a reference signal received quality report.

In a range expansion configuration, a UE may report both channel state information for clean (e.g., almost blank subframes (ABS)) and channel state information for unclean subframes. To address UE to UE interference scenarios when range expansion is enabled, the eNodeB may increase the number of channel state reports that are specified. Alternatively, in another configuration, range expansion may be disabled for UEs that experience UE to UE interference so that only two types of channel state reports occur.

As noted above, to address UE to UE interference, the eNodeB may restrict measurements of interference to specific subframes. The specific subframes may include subframes that experience UE to UE interference and subframes that do not experience UE to UE interference. The restricted measurements may be based on uplink/downlink configurations of an eNodeB or its neighboring eNodeB(s). In one configuration, the uplink/downlink configurations are the TDD configurations of TABLE 1. Additionally, the restricted measurements may be based on expected UE to UE interference. For example, the eNodeB may restrict measurements to subframes that are not expected to experience UE to UE interference. Specifically, the eNodeB may restrict measurements to common downlink subframes in the uplink/downlink configurations of both the eNodeB and the neighboring eNodeB. For example subframe 0 is the same for TDD configurations 1 and 2. Thus, subframe 0 is a common downlink subframe across TDD configurations 1 and 2.

The eNodeB may configure a UE to restrict measurements based on expected UE to UE interference. Alternatively, or in addition, the subframes for restricted measurements may be based on observed UE to UE interference, or a UE's capability to handle UE to UE interference. In one example, the restricted measurements include a report corresponding to subframes that are not expected to experience UE to UE interference.

To determine the subframes that are not expected to experience UE to UE interference, the eNodeB may obtain the uplink/downlink configuration of a neighboring eNodeB. The uplink/downlink configuration of the neighboring eNodeB may be obtained via backhaul messages, measurements made at the eNodeB, or messages from a UE identifying the uplink/downlink configuration of a neighboring eNodeB. Additionally, the eNodeB may use existing restricted subframe signaling or new signaling could be provided to inform the UE of the restricted subframes.

Furthermore, in yet another configuration, a common set of restricted subframes may be used by both a serving eNodeB and a neighboring eNodeB because the potential interference may affect both the serving eNodeB and the neighboring eNodeB(s).

In one configuration, when a UE is not expected to experience UE to UE interference, the restrictions on measurements are not specified. In another configuration, when a UE is not expected to experience UE to UE interference, the restricted subframes are different from the restricted subframes of a UE that are expected to experience UE to UE interference.

In another configuration, different decisions on handover and measurement configurations are based on whether a UE can handle UE to UE interference. For example, if the duty cycle of the interference is above a certain level, the restrictions on measurements are not specified. In another configuration, when a UE cannot handle the UE to UE interference, the restricted subframes are different from the restricted subframes of a UE that has the capability to address the UE to UE interference. A UE that can handle the interference could be a UE that can perform interference cancellation.

Handover decisions for UEs unable to handle the UE to UE interference may differ from the handover decisions for UEs that have the ability to address the UE to UE interference. The eNodeB may also consider the duty cycle, which subframes are impacted, or the interference level when determining whether to initiate a handoff. These parameters are considered, instead of averaging interference across all subframes. Additionally, the eNodeB may also consider the expected UE performance for downlink transmissions and uplink transmissions in the current cell in comparison to the expected performance after the hand off.

Different measurement configurations (e.g., restricted measurements) can be applied based on whether a UE is expected to see significant interference variations over time. Determining whether a UE is expected to see UE to UE interference may be based on UE feedback of its interference conditions. For example, a UE may report seeing UE to UE interference within the recent past, and therefore the reported interference may indicate future potential UE to UE interference. As another example, the eNodeB may determine that a UE experiences UE to UE interference based on previous channel state reports. For example, previous channel state reports that significantly vary may indicate bursty interference variations that could be due to UE to UE interference. Such bursty interference, which may vary significantly over time, may be addressed as discussed herein.

The UE may be provided with functionality to signal to the eNodeB that the UE is experiencing bursty interference, such as UE to UE interference. For example, the UE may measure interference or received power on different downlink subframes to determine whether the UE is experiencing UE to UE interference. The eNodeB may determine a UE is experiencing UE to UE interference based on previous channel state reports (such as CQI reports). In one example, significantly varying reports could indicate UE to UE interference.

In one aspect, the interference measurements of specific subframes may be adjusted based on whether a UE is located in an edge or a center of a cell when the neighboring eNodeB has a different uplink/downlink configuration in comparison to the uplink/downlink configuration of the serving eNodeB. In this aspect, an impact of interference variations may be less for a UE at a cell center in comparison to a UE at a cell edge.

As briefly mentioned above, an eNodeB may analyze a duty cycle of interference and which subframes are impacted when deciding whether to initiate a handover. For example, the eNodeB may initiate a handover when the particular subframes (e.g., subframes containing uplink grants) are impacted, rather than looking at the average across all subframes. The eNodeB may initiate a handoff based on the specific subframes impacted by the interference. For example, the eNodeB may initiate a handover when all downlink subframes that include uplink grants are impacted. In this example, the handoff may be initiated regardless of whether other downlink subframes are impacted. Furthermore, a handover may not be initiated when the number of impacted downlink subframes is below a threshold such that the UE may still be served on both downlink and uplink subframes.

Another way for an eNodeB to determine if interference varies across time is to examine other indicators. The eNodeB may utilize other interference indicators, such as channel quality information (CQI) reports, instead of or in addition to interference measurements of restricted subframes. For example, with dual CQI, an eNodeB may have good and bad subframe CQI measurements. This may be used in addition to or instead of the restricted interference measurements reports (which report average interference) of the specific subframes. In this example, the eNodeB may not initiate a handover when the CQI report is good even though measurement reports are not good. In addition to CQI reports, other indicators may include metrics, such as packet error rates, or an ability to decode downlink channels. For example, a UE may be kept on an LTE network when a UE can still receive data and control packets and send acknowledgments (ACKs) for some subframes. Additionally, the UE may be kept on the LTE network when the UE can send information on an uplink channel after decoding a corresponding physical downlink control channel (PDCCH).

In another aspect of the present disclosure, a UE may decide to autonomously restrict measurements, such as RSRP, RSSI, or RSRQ, to specific subframes not expected to experience interference. For example, the UE may restrict measurements to downlink subframes that are common to all uplink/downlink configurations. In one example, the UE restricts the interference measurements to subframes 0, 1, and 5, which are downlink subframes in each of the TDD configurations, as seen in TABLE 1. The UE may limit the interference measurements to downlink subframes common to all uplink/downlink configurations when the UE does not know the uplink/downlink configuration of the eNodeB that is being measured. For example, the UE may not know the uplink/downlink configuration of the eNodeB when taking inter-frequency measurements.

For intra-frequency measurements, the UE may be aware of the uplink/downlink configuration of the eNodeB being measured, as well as the neighbor eNodeB. For example, the UE may know that the uplink/downlink configuration of the neighboring eNodeB from a parameter conveyed as part of neighboring cell configuration (NeighCellConfig) information that is sent from the eNodeB. Thus, the UE may use more subframes than the common subframes for measurements. However, the UE may restrict measurements to the common subframes, such as subframes 0,1,5, and 6 (see TABLE 1), to avoid measurements capturing UE to UE interference. When the neighboring eNodeB is not using the same uplink/downlink configuration as the serving eNodeB, the UE may choose to restrict the interference measurements to subframes 0, 1, 5, and 6 of the TDD configurations shown in TABLE 1.

As noted above, the UE may restrict measurements to downlink subframes configured by a serving eNodeB. Alternatively, the UE may restrict measurements to downlink subframes that are detected as having low interference. As an example, the UE may use its own measurements to detect the downlink subframes that have reduced to no interference. In this example, the UE may measure interference of several subframes and may then utilize the measurements to select the restricted subframes based on the subframes that have reduced interference. The UE may report such interference conditions to the eNodeB.

The UE may also select the specific subframes based on the UE's capability to handle the UE to UE interference, whether the UE is expected to see UE to UE interference, a duty cycle of UE to UE interference, subframes that are impacted by the UE to UE interference, or a combination thereof. For example, if the duty cycle of the interference is low, the UE may decide to use restricted measurements. If the duty cycle is high, the UE may decide to account for the interference and report it.

The UE has multiple options for deciding what type of information to report when interference variations exist. The UE may report the best conditions, the worst conditions, or some intermediate conditions. The UE may decide which to report based on the duty cycle and level of the interference, whether the UE can handle such interference variations, which subframes are impacted, expected UE performance on the uplink/downlink in the current cell/carrier/technology, and or the expected performance if the UE hands off. In case a UE has multiple carriers available, the UE may prioritize selecting a carrier that does not see UE to UE interference.

It is understood that restricted measurements were introduced in LTE release 10 to enable range expansion by measuring pico cells with lower received power in comparison to the received power of macro cells. Typically, restricted measurements were performed only in a connected mode. Accordingly, measurements were unrestricted in an idle mode and would result in a UE not discovering weak pico cells. Nonetheless, when connected to a macro cell, the UE would be able to connect to the pico cell once the UE was in a connected mode. Similarly, the restricted measurements were not used for inter-frequency measurements.

However, in one aspect of the present disclosure, restricted measurements may occur in idle mode. When a UE is not in connected mode (i.e., connected to a base station) the UE is considered to be in idle mode, also referred to as "camping" on a cell. Restricted measurements may also occur when making inter-frequency measurements, such as measuring whether an LTE carrier experiences UE to UE interference (for example in a carrier aggregation configuration). Furthermore, new signaling may be introduced to inform the UE of the specific subframe set for interference measurements during idle mode measurements or inter-frequency measurements. Thus, when making measurements, a UE may only measure specific subframes, as other subframes may be known to experience high interference. Similarly an eNodeB may restrict a UE to only measure specific subframes known to experience lower interference.

It should be noted that the solutions and aspects described above are not limited to UE to UE interference based on uplink/downlink configurations and are not limited to TDD networks. The interference sources may be from other radio access technologies (RATs) and sources such as cross radio interference on a multi-radio device, for example a WLAN radio causing coexistence issues with an LTE radio.

Figure 9:
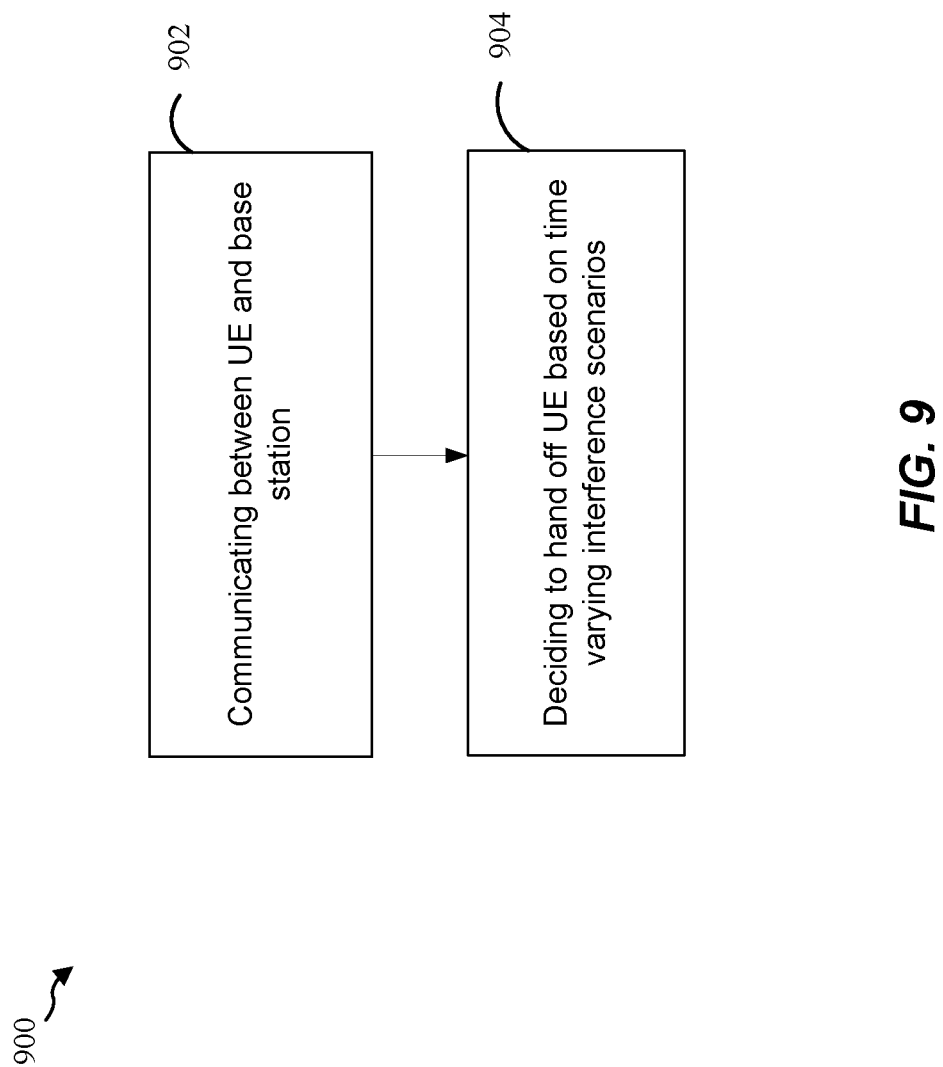
FIG. 9 is a flow chart illustrating wireless communication in view of time varying interference according to one aspect of the present disclosure.

FIG. 9 is a flow diagram 900 illustrating a method for wireless communication in view of time varying interference. In one aspect of the present disclosure, communication may take place between a user equipment (UE) and a serving base station (block 902). A decision may be made regarding whether to hand off the UE based at least in part on time varying interference factors, such as a report of time varying interference, whether the UE is expected to see time varying interference, a capability of the UE to handle the time varying interference, or which subframes are impacted by the time varying interference (block 904).

Figure 10:
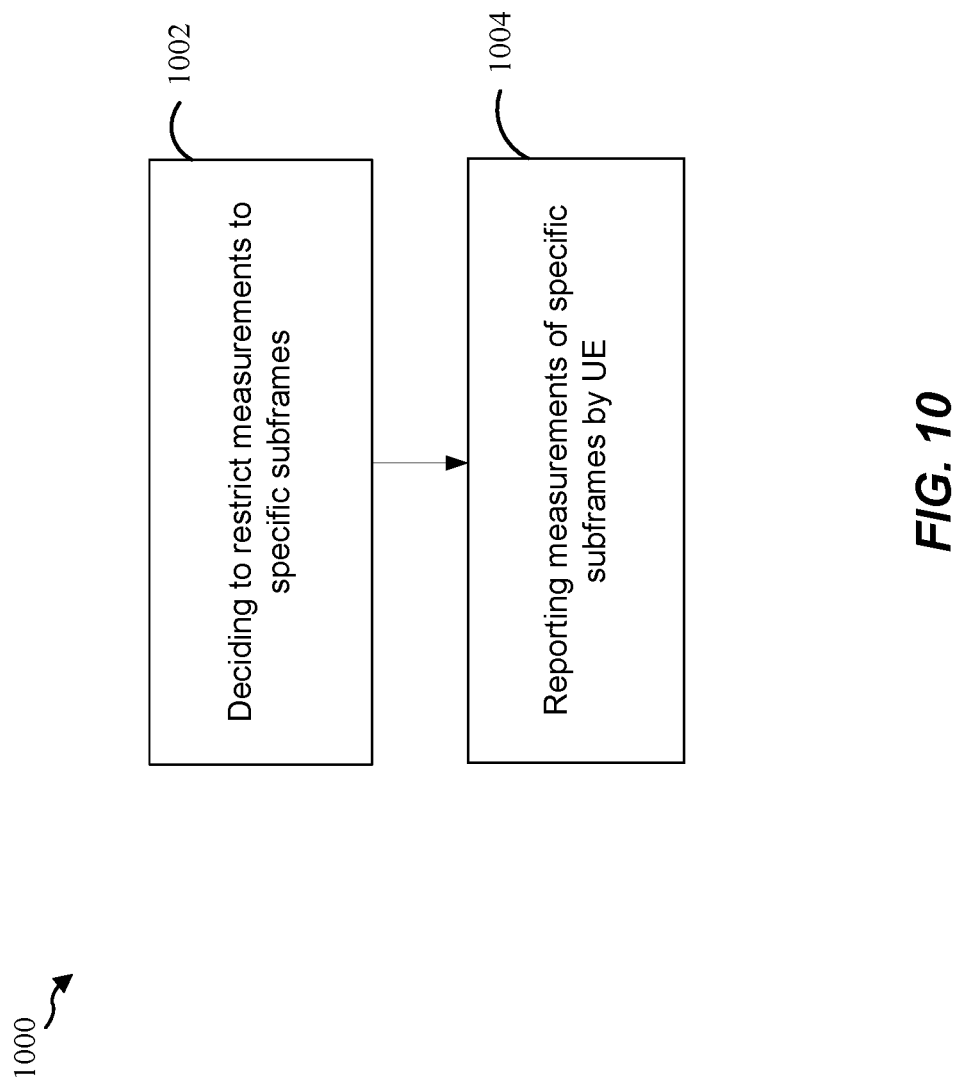
FIG. 10 is a flow chart illustrating wireless communication in view of time varying interference according to one aspect of the present disclosure.

FIG. 10 is a flow diagram 1000 illustrating a method for wireless communication in view of time varying interference. In one aspect of the present disclosure, a decision may be made to restrict measurements to specific subframes (block 1002). Measurements of the specific subframes may be reported (block 1004).

Figure 11:
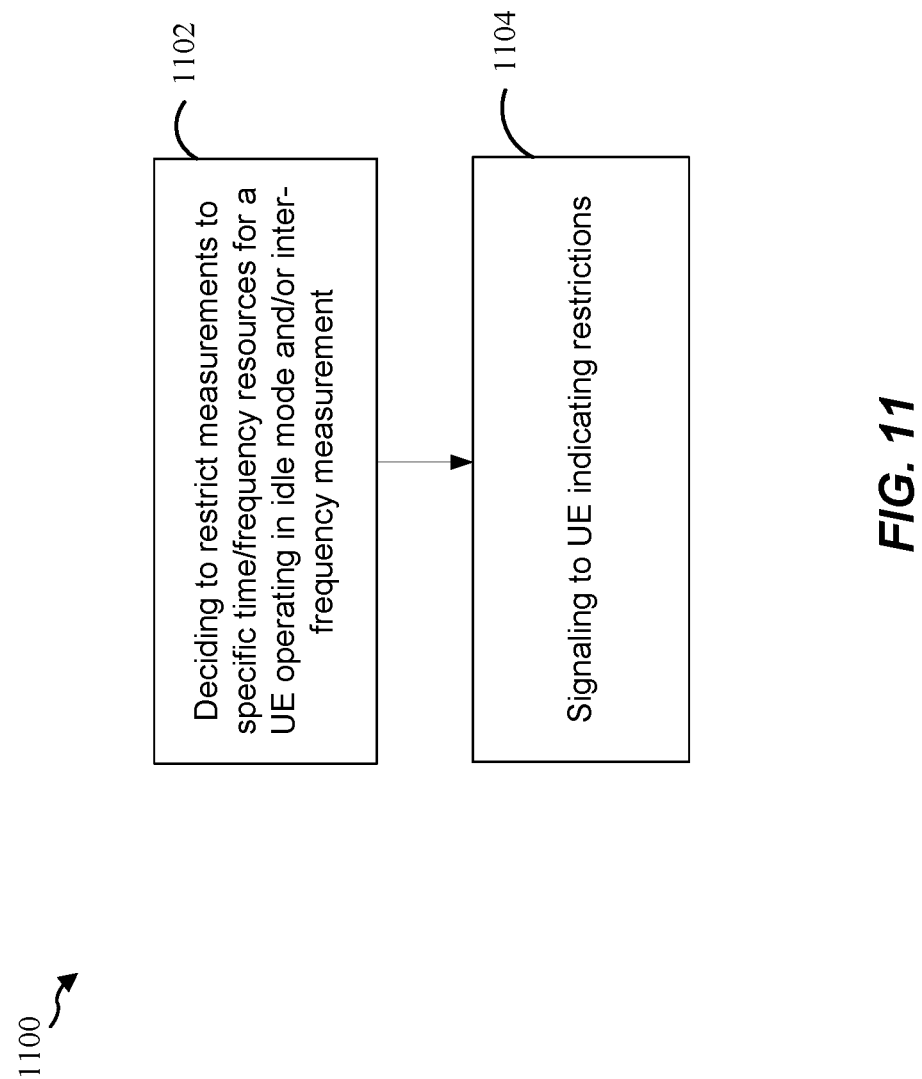
FIG. 11 is a flow chart illustrating wireless communication in view of time varying interference according to one aspect of the present disclosure.

FIG. 11 is a flow diagram 1100 illustrating a method for wireless communication in view of time varying interference. In one aspect of the present disclosure, a decision may be made to restrict measurements to specific sets of time/frequency resources for a user equipment (UE) operating in idle mode or performing inter-frequency measurement (block 1102). Information indicating the restrictions may be signaled (block 1104).

Figure 12:
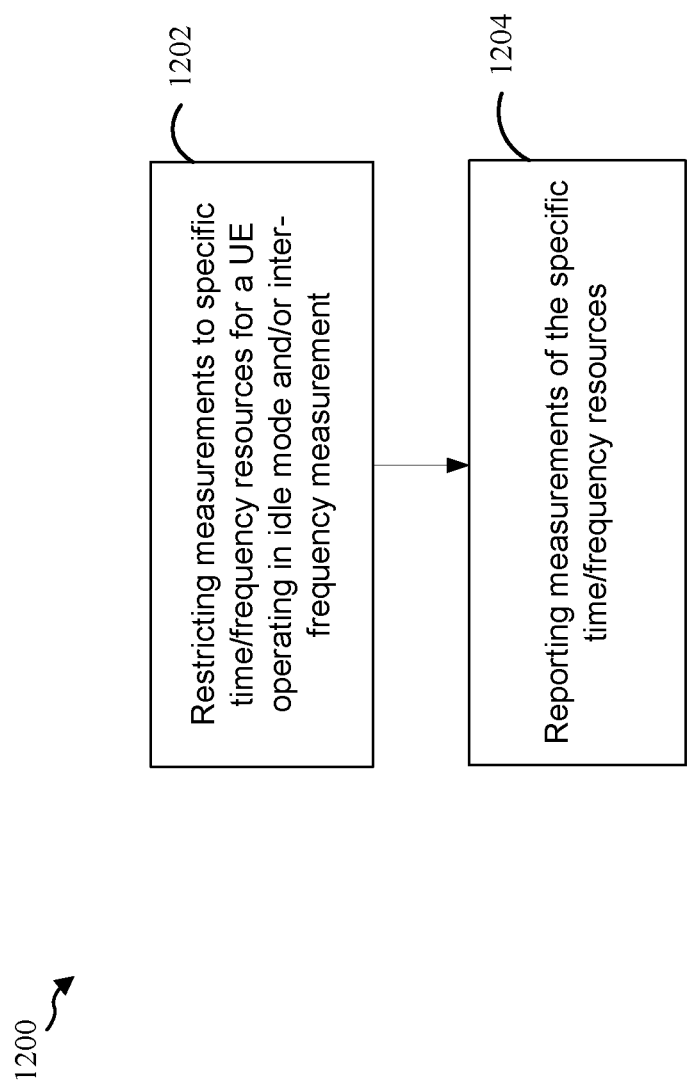
FIG. 12 is a flow chart illustrating wireless communication in view of time varying interference according to one aspect of the present disclosure.

FIG. 12 is a flow diagram 1200 illustrating a method for wireless communication in view of time varying interference. In one aspect of the present disclosure, a decision may be made to restrict measurements to specific sets of time/frequency resources for a user equipment operating in idle mode or performing inter-frequency measurement (block 1202). Measurements of the specific sets of time/frequency resources may be reported (block 1204).

Figure 13:
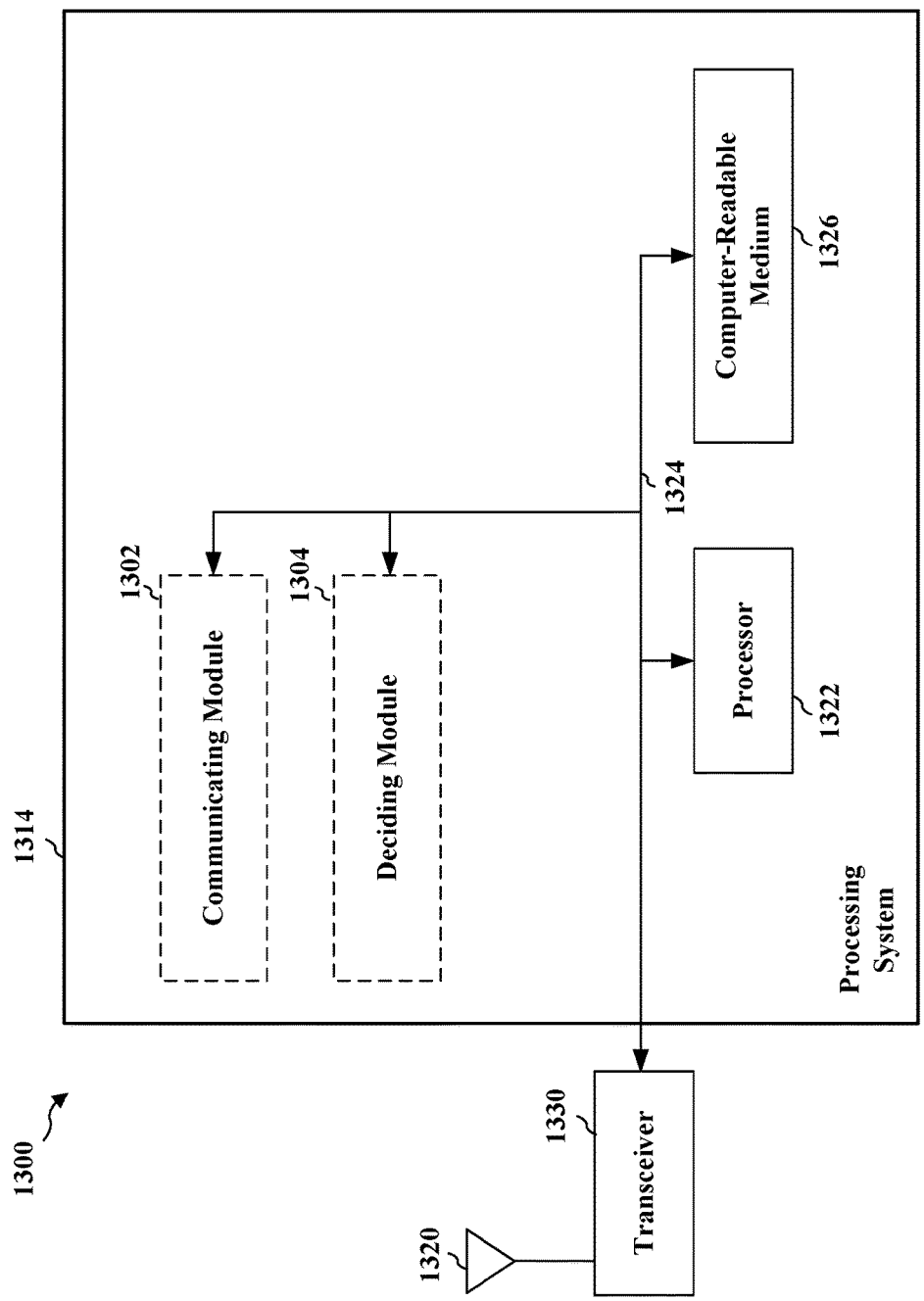
FIG. 13 is a block diagram illustrating different modules/means/components in an exemplary apparatus.

FIG. 13 is a diagram illustrating an example of a hardware implementation for an apparatus 1300 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various modules/circuits including one or more processors or modules, represented by the processor 1322, the modules 1302, 1304, and the computer-readable medium 1326. The bus 1324 may also link various other modules/circuits such as timing sources, peripherals, voltage regulators, and power management circuits, which are well known in the art, and therefore, will not be described any further.

The apparatus includes a processing system 1314 coupled to a transceiver 1330. The transceiver 1330 is coupled to one or more antennas 1320. The transceiver 1330 enables communicating with various other apparatus over a transmission medium. The processing system 1314 includes a processor 1322 coupled to a computer-readable medium 1326. The processor 1322 is responsible for general processing, including the execution of software stored on the computer-readable medium 1326. The software, when executed by the processor 1322, causes the processing system 1314 to perform the various functions described for any particular apparatus. The computer-readable medium 1326 may also be used for storing data that is manipulated by the processor 1322 when executing software.

The processing system 1314 includes a communicating module 1302 for communicating between a UE and base station. The communicating module 1302 may also be for reporting measurements of specific subframes by a user equipment (UE). The communicating module may also be for signaling to a UE information indicating measurement restrictions. The communicating module may also be for reporting measurements of specific sets of time/frequency resources. The processing system 1314 also includes a deciding module 1304 for deciding whether to hand off the UE based at least in part on time varying interference factors. The deciding module 1304 may also be for deciding to restrict measurements to specific subframes. The deciding module 1304 may also be for deciding to restrict measurements to specific sets of time/frequency resources for a user equipment (UE) operating in idle mode or performing inter-frequency measurement. The modules may be software modules running in the processor 1322, resident/stored in the computer-readable medium 1326, one or more hardware modules coupled to the processor 1322, or some combination thereof. The processing system 1314 may be a component of the UE 650 or the eNodeB 610 and may include the memory 660 or the controller/processor 659 or the memory 676 or the controller/processor 675.

In one configuration, the eNodeB 610 is configured for wireless communication including means for communicating, means for signaling, or means for reporting. In one aspect, the communicating, signaling, or reporting means may be the communicating module 1302, antenna 1320/620, TX processor 616, RX processor 670, controller/processor 675, processor 1322, computer-readable medium 1326 or memory 676 configured to perform the functions recited by the communicating, signaling, or reporting means. The eNodeB 610 may also be configured to include a means for deciding. In one aspect, the deciding means may be the deciding module 1304, controller/processor 675, processor 1322, computer-readable medium 1326 or memory 676 configured to perform the functions recited by the deciding means. In another aspect, the aforementioned means may be any module or any apparatus configured to perform the functions recited by the aforementioned means.

In one configuration, the UE 650 is configured for wireless communication including means for means for communicating or means for reporting. In one aspect, the communicating or reporting means may be the communicating module 1302, antenna 1320/652, TX processor 668, RX processor 656, controller/processor 659, processor 1322, computer-readable medium 1326 or memory 660 configured to perform the functions recited by the communicating or reporting means. The UE 650 may also be configured to include a means for deciding. In one aspect, the deciding means may be the deciding module 1304, controller/processor 659, processor 1322, computer-readable medium 1326 or memory 660 configured to perform the functions recited by the deciding means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, PCM (phase change memory), registers, hard disk, a removable disk, a CD/DVD, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. For example, if implemented in software, the functions may be stored on or transmitted over as one or more instructions or code on a non-transitory computer-readable medium. Computer-readable media includes computer storage media. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   determining, at a first user equipment (UE), to restrict measurements to specific subframes based on a known neighbor cell uplink/downlink configuration, the specific subframes not expected to experience interference from a second UE that causes interference on a subset of subframes within a measurement period, and the second UE connected to a neighboring base station using a different uplink/downlink configuration from a serving base station connected to the first UE; and
   reporting, by the first UE, measurements of the specific subframes.

2. The method of claim 1, in which the specific subframes comprise downlink subframes common to all uplink/downlink configurations.

3. The method of claim 1, in which the specific subframes comprise downlink subframes common to the known neighbor cell uplink/downlink configuration and a known serving cell uplink/downlink configuration.

4. The method of claim 1, in which the specific subframes comprise restricted downlink subframes configured by a serving base station.

5. The method of claim 1, in which the specific subframes comprise downlink subframes detected as having low interference.

6. The method of claim 1, in which the determining is further based at least in part on a capability of the first UE to handle time varying interference, whether the first UE is expected to see the time varying interference, a duty cycle of the time varying interference, or subframes that are impacted by the time varying interference.

7. The method of claim 1, in which the determining comprises measuring a metric indicative of subframe interference, comparing the metric with a measured metric on another subframe, and selecting restricted subframes as subframes having different measured metrics.

8. The method of claim 7, in which the measurements are performed for inter-frequency measurement of a multi-carrier Long Term Evolution (LTE) system.

9. An apparatus for wireless communication, comprising:
   means for determining, at a first user equipment (UE), to restrict measurements to specific subframes based on a known neighbor cell uplink/downlink configuration, the specific subframes not expected to experience interference from a second UE that causes interference on a subset of subframes within a measurement period, and the second UE connected to a neighboring base station using a different uplink/downlink configuration from a serving base station connected to the first UE; and
   means for reporting, by the first UE, measurements of the specific subframes.

10. The apparatus of claim 9, in which the specific subframes comprise downlink subframes common to all uplink/downlink configurations.

11. The apparatus of claim 9, in which the specific subframes comprise downlink subframes common to the known neighbor cell uplink/downlink configuration and a known serving cell uplink/downlink configuration.

12. The apparatus of claim 9, in which the specific subframes comprise restricted downlink subframes configured by a serving base station.

13. The apparatus of claim 9, in which the specific subframes comprise downlink subframes detected as having low interference.

14. The apparatus of claim 9, in which the means for determining is further based at least in part on a capability of the first UE to handle time varying interference, whether the first UE is expected to see the time varying interference, a duty cycle of the time varying interference, or subframes that are impacted by the time varying interference.

15. The apparatus of claim 9, in which the means for determining includes means for measuring a metric indicative of subframe interference, means for comparing with a measured metric on another subframe, and means for selecting restricted subframes as subframes having different measured metrics.

16. The apparatus of claim 15, in which the measurements are performed for inter-frequency measurement of a multi-carrier Long Term Evolution (LTE) system.

17. A non-transitory computer-readable medium having program code recorded thereon for wireless communication, the program code comprising:
   program code to determine, at a first user equipment (UE), to restrict measurements to specific subframes based on a known neighbor cell uplink/downlink configuration, the specific subframes not expected to experience interference from a second UE that causes interference on a subset of subframes within a measurement period, and the second UE connected to a neighboring base station using a different uplink/downlink configuration from a serving base station connected to the first UE; and
   program code to report, by the first UE, measurements of the specific subframes.

18. A first user equipment (UE) for wireless communication, comprising:
   a memory; and
   at least one processor coupled to the memory, the at least one processor configured:
      to determine to restrict measurements to specific subframes based on a known neighbor cell uplink/downlink configuration, the specific subframes not expected to experience interference from a second UE that causes interference on a subset of subframes within a measurement period, and the second UE connected to a neighboring base station using a different uplink/downlink configuration from a serving base station connected to the first UE; and
      to report measurements of the specific subframes.

19. A method of wireless communication, the method comprising:
   determining, at a base station, to restrict measurements to specific sets of time/frequency resources for a served user equipment (UE) operating in idle mode or performing inter-frequency measurement based on interference experienced at the served UE from a UE of a neighboring cell; and
   signaling, to the UE, information indicating the restricted measurements.

20. The method of claim 19, in which:
the specific sets of time/frequency resources comprise a plurality of sets of subframes, and the information comprises information indicating the sets of subframes.

21. The method of claim 19, in which the information comprises a carrier frequency and associated sets of time/frequency resources on which the restricted measurements are to be performed.

22. The method of claim 19, in which the information is UE specific, cell specific, or common for all cells in a paging area.

23. The method of claim 19, further comprising signaling the information based at least in part on a system information block (SIB) or master information block (MIB).

24. The method of claim 19, further comprising signaling the specific sets of time/frequency resources using radio resource control (RRC) signaling.

25. An apparatus for wireless communication, comprising:
means for determining, at a base station, to restrict measurements to specific sets of time/frequency resources for a served user equipment (UE) operating in idle mode or performing inter-frequency measurement based on interference experienced at the served UE from a UE of a neighboring cell; and
means for signaling, to the UE, information indicating the restricted measurements.

26. The apparatus of claim 25, in which:
the specific sets of time/frequency resources comprise a plurality of sets of subframes, and
the information comprises information indicating the sets of subframes.

27. The apparatus of claim 25, in which the information comprises a carrier frequency and associated sets of time/frequency resources on which the restricted measurements are to be performed.

28. The apparatus of claim 25, in which the information is UE specific, cell specific, or common for all cells in a paging area.

29. The apparatus of claim 25, further comprising means for signaling the information based at least in part on a system information block (SIB) or master information block (MIB).

30. The apparatus of claim 25, further comprising means for signaling the specific sets of time/frequency resources using radio resource control (RRC) signaling.

31. A non-transitory computer-readable medium having program code recorded thereon for wireless communication, the program code comprising:
program code to determine, at a base station, to restrict measurements to specific sets of time/frequency resources for a served user equipment (UE) operating in idle mode or performing inter-frequency measurement based on interference experienced at the served UE from a UE of a neighboring cell; and
program code to signal, to the UE, information indicating the restricted measurements.

32. A base station for wireless communication, comprising:
a memory; and
at least one processor coupled to the memory, the at least one processor configured:
to determine to restrict measurements to specific sets of time/frequency resources for a served user equipment (UE) operating in idle mode or performing inter-frequency measurement based on interference experienced at the served UE from a UE of a neighboring cell; and
to signal, to the UE, information indicating the restricted measurements.

33. A method of wireless communication, the method comprising:
restricting, at a first user equipment (UE), measurements to specific sets of time/frequency resources, the first UE operating in idle mode or performing inter-frequency measurement, the specific sets of time/frequency resources not expected to experience interference from a second UE that causes interference on a set of time/frequency resources within a measurement period, and the second UE connected to a neighboring base station using a different uplink/downlink configuration from a serving base station connected to the first UE; and
reporting, by the first UE, measurements of the specific sets of time/frequency resources.

34. An apparatus for wireless communication, comprising:
means for restricting, at a first user equipment (UE), measurements to specific sets of time/frequency resources, the first UE operating in idle mode or performing inter-frequency measurement, the specific sets of time/frequency resources not expected to experience interference from a second UE that causes interference on a set of time/frequency resources within a measurement period, and the second UE connected to a neighboring base station using a different uplink/downlink configuration from a serving base station connected to the first UE; and
means for reporting, by the first UE, measurements of the specific sets of time/frequency resources.

35. A non-transitory computer-readable medium having program code recorded thereon for wireless communication, the program code comprising:
program code to restrict, at a first user equipment (UE), measurements to specific sets of time/frequency resources, the first UE operating in idle mode or performing inter-frequency measurement, the specific sets of time/frequency resources not expected to experience interference from a second UE that causes interference on a set of time/frequency resources within a measurement period, and the second UE connected to a neighboring base station using a different uplink/downlink configuration from a serving base station connected to the first UE; and
program code to report, by the first UE, measurements of the specific sets of time/frequency resources.

36. A first user equipment (UE) for wireless communication, comprising:
a memory; and
at least one processor coupled to the memory, the at least one processor configured:
to restrict measurements to specific sets of time/frequency resources, the first UE operating in idle mode or performing inter-frequency measurement, the specific sets of time/frequency resources not expected to experience interference from a second UE that causes interference on a set of time/frequency resources within a measurement period, and the second UE connected to a neighboring base station using a different uplink/downlink configuration from a serving base station connected to the first UE; and to report measurements of the specific sets of time/frequency resources.

* * * * *